United States Patent
Stepanenko

(10) Patent No.: US 9,323,537 B2
(45) Date of Patent: Apr. 26, 2016

(54) METHOD FOR DETERMINING THE STRUCTURE OF A HYBRID COMPUTING SYSTEM

(75) Inventor: Sergey Alexandrovich Stepanenko, Sarov (RU)

(73) Assignee: Federal State Unitary Enterprise—AU—Russian Scientific Research Institute of Experimental Physics—FSUE RVNC—VNIIEF, Sarov (RU)

( * ) Notice: Subject to any disclaimer, the term of this patent is extended or adjusted under 35 U.S.C. 154(b) by 371 days.

(21) Appl. No.: 13/881,745

(22) PCT Filed: Oct. 13, 2011

(86) PCT No.: PCT/RU2011/000801
§ 371 (c)(1),
(2), (4) Date: Apr. 26, 2013

(87) PCT Pub. No.: WO2012/060736
PCT Pub. Date: May 10, 2012

(65) Prior Publication Data
US 2013/0212356 A1    Aug. 15, 2013

(30) Foreign Application Priority Data

Nov. 1, 2010 (RU) ................. 2010144734

(51) Int. Cl.
*G06F 9/38* (2006.01)
*G06F 9/50* (2006.01)
*G06F 15/80* (2006.01)
(52) U.S. Cl.
CPC ............ *G06F 9/3891* (2013.01); *G06F 9/3885* (2013.01); *G06F 9/3887* (2013.01); *G06F 9/3889* (2013.01); *G06F 9/5061* (2013.01); *G06F 9/5066* (2013.01); *G06F 15/80* (2013.01)

(58) Field of Classification Search
None
See application file for complete search history.

(56) References Cited

U.S. PATENT DOCUMENTS 5,588,152 A * 12/1996 Dapp .................... G06F 9/3838
                                                   712/16
5,590,345 A * 12/1996 Barker ............... G06F 9/30189
                                                   712/11

(Continued)

FOREIGN PATENT DOCUMENTS

EP    1873627 A1    1/2008
EP    2090954 A1    8/2009

(Continued)

OTHER PUBLICATIONS

'Instruction Execution Trade-offs for SIMD vs. MIMD vs. Mixed Mode Parallelism' by Thomas B. Berg and Howard Jay Siegel, copyright 1991 by IEEE.*

(Continued)

*Primary Examiner* — Steven Snyder

(57) ABSTRACT

A method comprises measuring the execution time T1 for a problem to be solved with a program being run by a single processor, measuring the execution time TM and TS of MIMD and SIMD program fragments being run by a single processor and a single accelerator correspondingly, determining the specific acceleration ρ of the execution time for an SIMD program fragment being run by a single accelerator in comparison with the execution time for the fragment being run by a single processor, determining a portion of the execution time for an MIMD fragment being run by a single processor and a portion of the execution time for an SIMD fragment being run by a single processor and adjusting the quantity of processors or accelerators comprised in a hybrid computing system structure according to the data obtained.

1 Claim, 2 Drawing Sheets

(56) References Cited

U.S. PATENT DOCUMENTS

| | | | | |
|---|---|---|---|---|
| 5,625,836 | A * | 4/1997 | Barker | G06F 7/483 709/214 |
| 5,708,836 | A * | 1/1998 | Wilkinson | G06F 7/483 712/11 |
| 5,710,935 | A * | 1/1998 | Barker | G06F 9/30189 711/149 |
| 5,717,943 | A * | 2/1998 | Barker | G06F 9/30189 712/14 |
| 5,717,944 | A * | 2/1998 | Wilkinson | G06F 7/483 712/14 |
| 5,734,921 | A * | 3/1998 | Dapp | G06F 9/30036 709/238 |
| 5,842,031 | A * | 11/1998 | Barker | G06F 9/30189 712/23 |
| 5,963,746 | A * | 10/1999 | Barker | G06F 15/8007 709/238 |
| 6,487,651 | B1 * | 11/2002 | Jackson | G06F 15/17337 712/13 |
| 7,818,541 | B2 * | 10/2010 | Rhoades | G06F 1/10 712/10 |
| 7,831,803 | B2 * | 11/2010 | Inglet | G06F 9/5061 712/20 |
| 7,856,543 | B2 * | 12/2010 | Rhoades | G06F 1/10 712/22 |
| 7,917,727 | B2 * | 3/2011 | Rhoades | G06F 1/10 712/22 |
| 8,127,112 | B2 * | 2/2012 | Rhoades | G06F 1/10 712/22 |
| 2003/0041163 | A1 * | 2/2003 | Rhoades | G06F 1/10 709/232 |
| 2007/0217453 | A1 * | 9/2007 | Rhoades | G06F 1/10 370/503 |
| 2007/0220232 | A1 * | 9/2007 | Rhoades | G06F 1/10 712/20 |
| 2009/0305790 | A1 * | 12/2009 | Lu | A63F 13/12 463/42 |
| 2011/0083000 | A1 * | 4/2011 | Rhoades | G06F 1/10 712/22 |
| 2012/0239706 | A1 * | 9/2012 | Steinfadt | G06F 19/22 707/803 |

FOREIGN PATENT DOCUMENTS

| | | |
|---|---|---|
| RU | 2084953 C1 | 7/1997 |
| RU | 2201015 C2 | 3/2003 |
| RU | 2010144734 | 12/2011 |
| WO | 0146777 A2 | 6/2001 |
| WO | 2012/060736 A1 | 5/2012 |

OTHER PUBLICATIONS

'Runtime Scheduling of Dynamic Parallelism on Accelerator-Based Multi-core Systems' by Filip Blagojevic et al., Oct. 3, 2007.*

'Comparing SIMD and MIMD Programming Modes' by Ravikanth Ganesan et al., Journal of Parallel and Distributed Computing 35, 91-96 (1996).*

'Reconfiguration and Communication-Aware Task Scheduling for High-Performance Reconfigurable Computing' by Miaoqing Huang et al., ACM Transactions on Reconfigurable Technology and Systems, vol. 3, No. 4, Article 20, Pub. date: Nov. 2010.*

'A Reconfigurable Processor Array with Routing LSis and General Purpose DSPs' by Jacob Levison et al., copyright 1992 by IEEE.*

'Metrics for Early-Stage Modeling of Many-Accelerator Architectures' by Siddharth Nilakantan, copyright 2012, Published by the IEEE Computer Society.*

'Fast solution of large N x N matrix equations in an MIMD-SIMD Hybrid System' by Leo Chin Sim et al., copyright 2003 by Elsevier B.V.*

'Parallel application performance on shared high performance reconfigurable computing resources' by Melissa C. Smith et al., copyright 2004 by Elsevier B.V.*

'Introduction to Parallel Computing' by Frank Willmore, The University of Texas at Austin, Jan. 10, 2013.*

'VLSI Architecture Design Approaches for Real-Time Video Processing' by A. Ahmad et al., WSEAS Transactions on Circuits and Systems, Issue 8, vol. 7, Aug. 2008.*

Leo Chin Sim et al, MIMD-SIMD hybrid system—towards a new low cost parallel system, Parallel Computing, vol. 29, Issue 1, 2003, p. 21-36, Elsevier Science B.V.—http://www.sciencedirect.com/science/article/pii/S0167819102001825.

* cited by examiner $\dfrac{T_1 \cdot \varphi}{q}$ - execution time for an MIMD fragment being run by $q$ processors;

$\dfrac{T_1 \cdot (1-\varphi)}{\rho}$ - execution time for an SIMD fragment being run by a single accelerator.

METHOD FOR DETERMINING THE STRUCTURE OF A HYBRID COMPUTING SYSTEM

TECHNICAL FIELD

The invention relates to the field of computer engineering and can be used for creating hybrid computing systems, containing an MIMD component, composed of a single or multiple processors, and an SIMD component, composed of a single or multiple arithmetic accelerators.

PRIOR ART

An MIMD-SIMD hybrid system (hereinafter hybrid system) is a combination of SIMD and MIMD components working in parallel. Such a parallel architecture is able to develop a higher computing speedup in comparison with a single processor, rather than a corresponding MIMD architecture is able to develop taken alone.

The closest prototype to the invention as claimed by its essential features is a method for determining the structure of an MIMD-SIMD hybrid computing system (rf. www.elsevier.com/locate/parco Parallel Computing 29 (2003) 21-36, MIMD-SIMD hybrid system—towards a new low cost parallel system, Leo Chin Sim, Heiko Schroder, Graham Leedham). The method comprises measuring the execution time $T_1$ for a problem to be solved with a program being run by a single processor, measuring the execution time $T_M$ and $T_S$ (alternatively $T_1$ and $T_{SIMD}$ correspondingly) of MIMD and SIMD program fragments being run by a single processor and a single accelerator correspondingly, determining the specific acceleration $\rho$ (alternatively X) of the execution time for an SIMD program fragment being run by a single accelerator in comparison with the execution time for the same fragment being run by a single processor and adjusting the quantity of accelerators comprised into a hybrid computing system structure according to the data obtained, estimating the computing speedup, developed by the system.

The drawback of the method above is inefficient application of hybrid computing system performance capabilities caused by a non-adjustable quantity of the processors comprised in a hybrid system structure, that excludes the ability of a higher speedup developing for certain class of computing processors in comparison with the systems wherein the quantity of the accelerators is adjustable.

DISCLOSURE

The task the invention is to solve, consists in providing a method, allowing to create a hybrid computing system structure, taking into account the requirements to the computing process being run.

The technical result lies in reducing the computing process execution time with providing a hybrid computing system structure, taking into account certain process peculiarities.

Said technical result is obtained due to the fact that in the course of the method as claimed for determining the structure of a hybrid computing system including an MIMD component containing at least a single processor and an SIMD component containing at least a single arithmetic accelerator, wherein the method comprises measuring the execution time $T_1$ for a problem to be solved with a program being run by a single processor, measuring the execution time $T_M$ and $T_S$ of MIMD and SIMD program fragments being run by a single processor and a single accelerator correspondingly, determining the specific acceleration $\rho$ of the execution time for an SIMD fragment being run by a single accelerator in comparison with the execution time for the fragment being run by a single processor and adjusting the quantity of processors or accelerators comprised into a hybrid computing system structure according to the data obtained, whereas contrary to the prototype it is determined a portion $\phi$ of the execution time for an MIMD fragment being run by a single processor and a portion $1-\phi$ of the execution time for an SIMD fragment being run by a single processor relative to the execution time of the program being run by a single processor; the ratio of the execution time portion for an SIMD fragment being run by a single processor and the execution time portion for an MIMD fragment being run by a single processor is compared with the specific acceleration value $$\rho = \frac{(1-\varphi)T_1}{T_s}$$

of the execution time for an SIMD fragment being run by a single accelerator in comparison with the execution time for an SIMD fragment being run by a single processor, wherein for $$\rho > \frac{1-\varphi}{\varphi}$$

the quantity of MIMD component processors is being increased, and for $$\rho < \frac{1-\varphi}{\varphi}$$

the quantity of SIMD component accelerators is being increased.

Performing in total all the characteristics of the method as claimed enables to provide a hybrid computing system structure, wherein for SIMD fragment execution time being greater, the SIMD component performance is increased due to the increased quantity of accelerators, or for MIMD fragment execution time being greater, the MIMD component performance is increased due to the increased quantity of processors. As a result a system with the structure obtained develops computing speedup according to certain computing process peculiarities, exceeding the speedup, developed by the system with the structure taking not into account said peculiarities.

EMBODIMENT OF THE INVENTION

Figure 1:
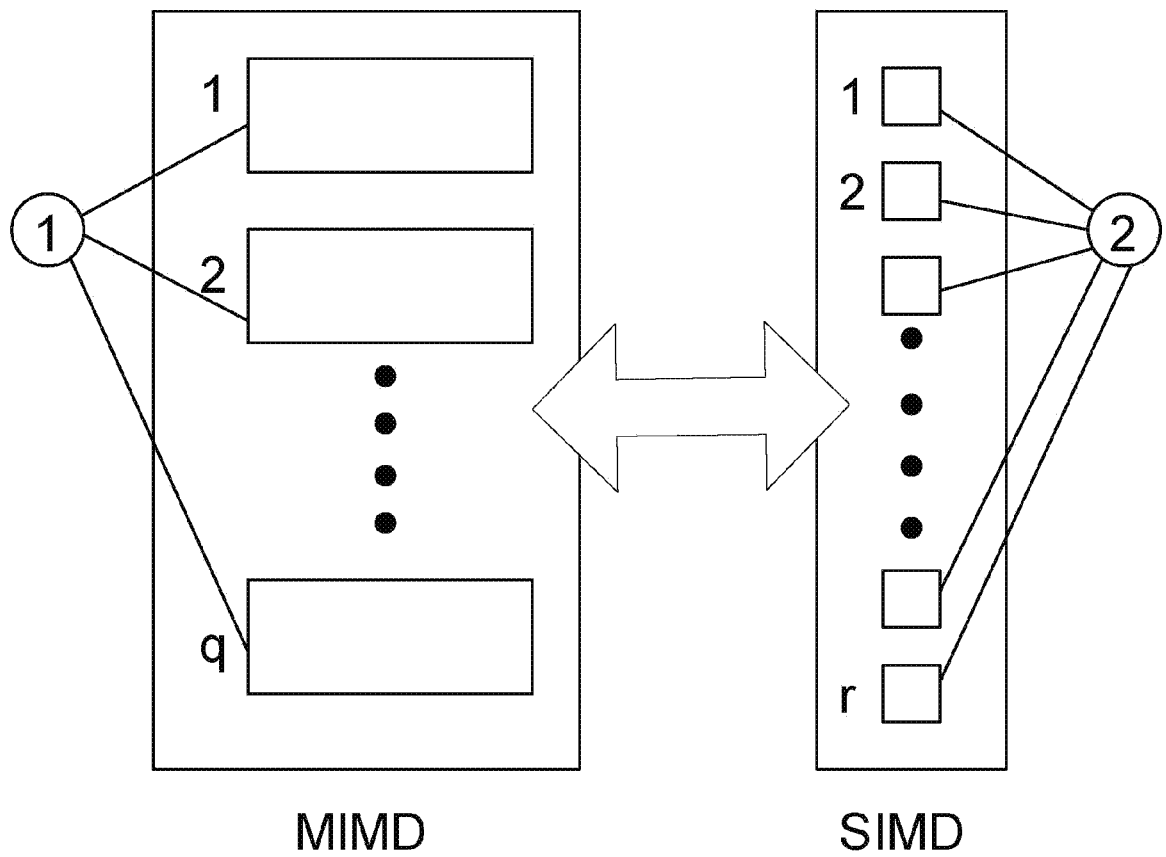
FIG. 1—shows a hybrid computing system structure.

A hybrid computing system contains q processors 1, forming an MIMD component and running an MIMD computing program fragment, and r arithmetic accelerators 2, forming an SIMD component and executing an SIMD computing program fragment.

Any MIMD-class computing systems may be used as an MIMD component; an MIMD component processor is a separate MIMD-class system processing element [Tsylker B. Y., Orlov S. A. Computer and System Administration. S.-Pb, 2004.]

The examples of SIMD components suitable for the method to be implemented are commonly known arithmetic accelerators by NVIDIA and AMD, the Cell processors by IBM, the ClearSpeed processors by Intel, as well as the Systola 1024 arithmetic accelerator, used in the closest prototype. Their common feature is presence of multiple "simple" arithmetic units, having in general a substantially higher performance achieved in specific program fragments in comparison with the processor.

The method as claimed to be implemented:
  the time $T_1$ required for a single processor to solve a problem through the whole program execution is measured by means of a system timer.
  the time $T_M$ required for a single processor for MIMD fragment execution is measured by means of a system timer.
  the time $T_S$ required for a single accelerator for SIMD fragment execution is measured by means of a system timer.
  based on the values obtained the portion of the execution time $$\varphi = \frac{T_M}{T_1}$$

for an MIMD fragment and the specific acceleration value $$\rho = \frac{(1-\varphi)T_1}{T_s}$$

are determined.
  the ratio of the time portion for the computing being run by a single accelerator and the time portion for the computing being run by a single processor is compared with the specific acceleration value ρ. For $$\rho > \frac{1-\varphi}{\varphi}$$

the quantity of processors in the computing system is being increased. For $$\rho < \frac{1-\varphi}{\varphi},$$

the quantity of accelerators is being increased.

The efficiency of the method as claimed is proved by the following ratios, disclosed with respect to parallel programming through weak scaling for a constant size of a problem (Gustafson's law [e.g., rf. Tsylker B. Y., Orlov S. A. Computer and System Administration. S.-Pb, 2004. pp. 488-490]) and with respect to parallel programming through strong scaling for a size of a problem to be measured (Amdahl's law [e.g., rf. Tsylker B. Y., Orlov S. A. Computer and System Administration. S.-Pb, 2004. стр. 486-488]).

For a problem to be solved by a single processor an interval of time $T_1$ is required.

It is supposed that the process for solving the same problem by a hybrid computing system, comprising a single processor and a single accelerator, requires a time interval, calculated according to the formula:

$$T_{1,1} = T_M + T_S, \qquad (1)$$

wherein $T_M = T_1 \varphi$—the execution time for an MIMD fragment being run by a single processor;
  $0 \leq \varphi \leq 1$—a portion of the execution time for an MIMD fragment;

$$T_s = (1-\varphi)\frac{T_1}{\rho}$$

—the execution time for an SIMD fragment being run by a single accelerator;
  $\rho > 1$—the specific acceleration of the execution time for an SIMD fragment developed due to an accelerator being applied in comparison with a processor.

Figure 2:
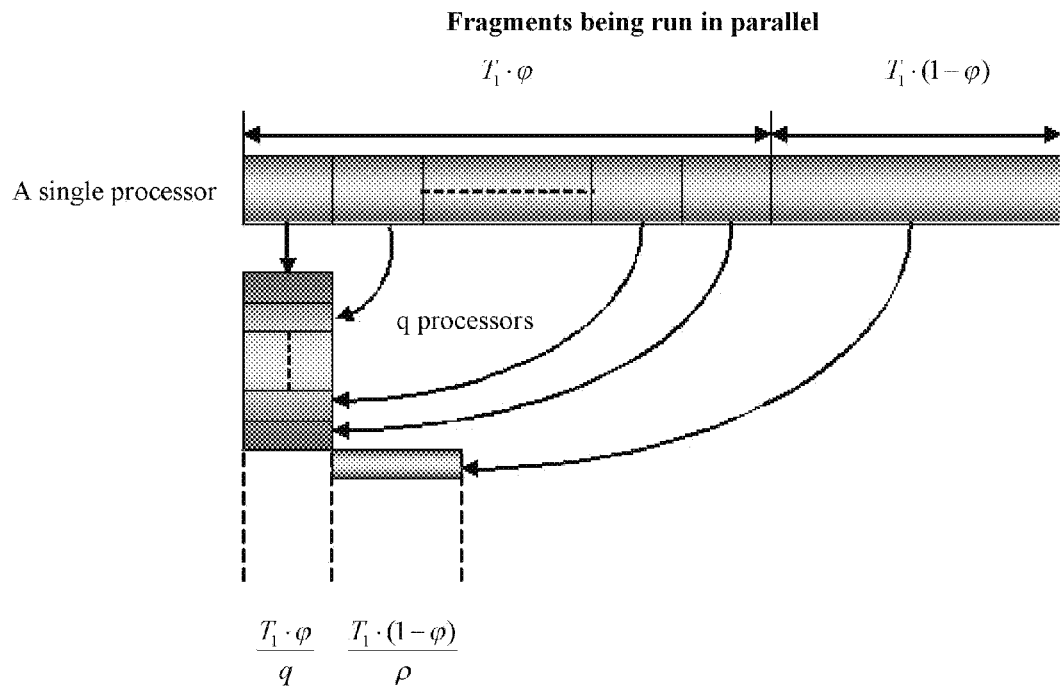
FIG. 2—shows a diagram for determining the execution time portion of an MIMD fragment and the execution time portion of an SIMD fragment and determining the computing speedups for said fragments.

The stated computing process decomposition with respect to parallel programming through strong scaling for q processors 1 and a single accelerator 2 is shown in the FIG. 2.

The computing time for weak scaling being run by the system comprising q processors 1 and a single accelerator 2 is calculated according to the formula:

$$\tilde{T}_{q,1} = T_1 \cdot \varphi + T_1 \cdot (1-\varphi) \cdot \frac{q}{\rho}. \qquad (2)$$

For the system comprising 1 processor 1 and r accelerators 2 it is valid as follows:

$$\tilde{T}_{1,r} = T_1 \cdot \varphi \cdot r + T_1 \cdot (1-\varphi) \cdot \frac{1}{\rho}. \qquad (3)$$

Similarly the computing time values $T_{q,1}$ and $T_{1,r}$ are calculated for strong scaling being run by the system comprising q processors 1 and a single accelerator 2 and the one comprising a single processor 1 and r accelerators 2.

The computing time estimation results are listed in the Table 1.

The values of the parameters ρ and φ are determined for an elementary computer, comprising a single processor and a single accelerator. They are referred to as primary parameters.

The speedup for weak scaling being run by the system comprising q processors 1 and a single accelerator 2 is calculated according to the formula:

$$\tilde{K}_{q,1} = \frac{T_1 q}{\tilde{T}_{q,1}}. \qquad (4)$$

Inserting the equation $$\tilde{T}_{q,1} = T_1 \varphi + T_1(1-\varphi)\frac{q}{\rho}, \qquad (5)$$

into the formula (4) it is found:

$$\tilde{K}_{q,1} = \frac{q}{\varphi + (1-\varphi)\frac{q}{\rho}} \qquad (6)$$

Evidently, for $q \to \infty$ the value $$\tilde{K}_{q,1} = \frac{\rho}{1-\varphi}.$$

is maximal

The inequation $\tilde{K}_{q,1} \geq q$ to be valid (i.e., in order the accelerators 2 being applied should prove to be advantageous in comparison with the quantity of the processors 1 being simply increased), it is required to fulfill the condition:

$$\frac{q}{\varphi + (1-\varphi)\frac{q}{\rho}} \geq q. \qquad (7)$$

It is valid for $q \leq \rho$.

For a system comprising a single processor and r accelerators the speedup is calculated according to the formula:

$$\tilde{K}_{1,r} = \frac{T_1 r}{T_1 \varphi r + T_1(1-\varphi)\frac{1}{\rho}} = \frac{r}{\varphi r + (1-\varphi)\frac{1}{\rho}}. \qquad (8)$$

Evidently, $$\tilde{K}_{1,r} = \frac{1}{\varphi} \text{ for } r \to \infty.$$

The value $$\tilde{K}_{1,r} \geq r, \text{ for } r \leq \frac{1}{\varphi} - \frac{1-\varphi}{\varphi\rho}.$$

The speedup for a system comprising q processors and r accelerators, wherein q=r, is calculated according to the formula:

$$\tilde{K}_{q,q} = \frac{T_1 q}{T_1 \varphi + T_1(1-\varphi)\frac{1}{\rho}} = \frac{q}{\varphi + \frac{1-\varphi}{\rho}}. \qquad (9)$$

Generally $K_{q,r} = K_{m,1}$ for q>r, wherein $$m = \frac{q}{r}$$

and $K_{q,r} = K_{1,n}$, for q<r, wherein $$n = \frac{r}{q};$$

q and r being supposed as such, that m or n—are integers.

Further estimation will be given to the conditions wherein $\tilde{T}_{q,1} \leq \tilde{T}_{1,q}$, the increase in the quantity of the processors 1 is more efficient than the increase in the quantity of the accelerators 2.

Evidently, for this purpose the inequation $$T_1\varphi + T_1(1-\varphi)\frac{q}{\rho} \leq T_1\varphi q + T_1(1-\varphi)\frac{1}{\rho}, \qquad (10)$$

ought to be fulfilled, being valid for $$\rho \geq \frac{1-\varphi}{\varphi}.$$

For $$\rho = \frac{1-\varphi}{\varphi}$$

the increase in the quantity of the processors or the increase in the quantity of accelerators equally affect the computing process time.

Thus, the efficiency of a component being introduced is determined from the primary properties of the computing process.

The speedup for strong scaling being run by the system comprising q processors and a single accelerator is calculated according to the formula:

$$K_{q,1} = \frac{T_1}{T_{q,1}} = \frac{T_1}{T_1\frac{\varphi}{q} + T_1(1-\varphi)\frac{1}{\rho}}. \qquad (11)$$

Wherefrom $$K_{q,1} = \frac{q}{\varphi + (1-\varphi)\frac{q}{\rho}}. \qquad (12)$$

For $q \to \infty$ the value $$K_{q,1} = \frac{\rho}{(1-\varphi)}. \qquad (13)$$

is maximal.

For $\rho > q$ it is valid $K_{q,1} > q$.

For a system comprising a single processor and r accelerators it is found:

$$K_{1,r} = \frac{T_1}{T_1\varphi + T_1(1-\varphi)\frac{1}{r\rho}} = \frac{r}{\varphi r + \frac{1-\varphi}{\rho}}. \quad (14)$$

For r→∞ it results:

$$K_{1,r} = \frac{1}{\varphi}. \quad (15)$$

The expression $K_{1,r} \leq r$ is valid for $$r \leq \frac{1}{\varphi} - \frac{1-\varphi}{\varphi \cdot \rho}. \quad (16)$$

The speedup $K_{q,r}$ developed by a system comprising q processors and r accelerators, wherein q=r, is calculated according to the formula:

$$K_{q,q} = \frac{q}{\varphi + \frac{1-\varphi}{\rho}}. \quad (17)$$

Evidently, $K_{q,r}=K_{m,1}$, for q>r, wherein $$m = \frac{q}{r}$$

and $K_{q,r}=K_{1,n}$, for q<r, wherein $$n = \frac{r}{q};$$

q and r being supposed as such, that m or n—are integers.

Further estimation will be given to the parameters of the process wherein for strong scaling it is efficient to increase the quantity of the processors. Evidently, the condition $$T_1\frac{\varphi}{q} + T_1(1-\varphi)\frac{1}{\rho} \leq T_1\varphi + T_1\frac{1-\varphi}{q\rho}. \quad (18)$$

ought to be fulfilled, being valid for $$\rho \geq \frac{1-\varphi}{\rho}.$$

For $$\rho = \frac{1-\varphi}{\varphi}.$$

the increase in the quantity of the processors or the increase in the quantity of accelerators equally affect the computing process time Thus, the efficiency of computing process accelerating by increasing the quantity of processors or accelerators both for strong scaling and for weak scaling depends on the values of the parameters φ and ρ.

The computing speedup values found for strong scaling and weak scaling are listed in the Table 2.

It is to be noted that the values for both modes are identical under the same quantitative and qualitative computing conditions. For both modes it is efficient to increase the quantity of the processors involved, whereas $$\rho > \frac{1-\varphi}{\varphi}.$$

being valid.

Exemplary Embodiment of the Method

Further it is determined a hybrid computing system structure for solving the problems on determining the Morse potential values used in molecular dynamics.

The computing time required for a single processor for 55×55×55 lattice spacing size of a problem was measured with a system timer, resulting in $T_1$=22,96 sec. Parallel programming was executed through weak scaling.

The computing time required for a hybrid system to solve the same problem wherein the system comprising q=1 processors and r=1 accelerators, was measured by means of a system timer, resulting in $T_1$=9.87 sec, wherein the execution time for an MIMD fragment being run by a single processor resulted in $T_M$=7.07 sec, and the execution time for an SIMD fragment being run by a single accelerator resulted in $T_S$=2.80 sec.

The values measured the parameters $$\varphi = \frac{T_m}{T_s} \approx 0.31 \text{ and } \rho = \frac{(1-\varphi)T_1}{T_s} \approx 5.67$$

are found.

Since $$\rho > \frac{1-\varphi}{\varphi}$$

it is reasonable to increase the quantity of the processors involved in the hybrid system structure for the program being run.

For example, for q=2 processors and r=1 accelerators involved according to the formula (2) it is found $T_{2,1}$=12.70 sec. The experimental value measured with system timer is $T_{2,1}$=13.22 sec.

The theoretical and experimental speedup values are $\tilde{K}_{2,1}$=3.62 and $\tilde{K}_{2,1}$=3.47 correspondingly.

If according to the prototype a hybrid system comprising $q=1$ processors and $r=2$ accelerators is used for solving the problem, then $T_{1,2}=16.9c$, $\tilde{K}_{1,2}=2.7$.

As it is seen from the example observed the method as claimed has provided a hybrid computing system, enabling to solve said problem on determining the potential values 1.3 times faster as compared to the system according to the prior art.

Similarly, the formulae (2) and (6) and the experimental values being used the hybrid system comprising $q=4$ processors and $r=1$ accelerators demonstrates ability to solve said problem 1.67 times faster as compared to the system comprising $q=1$ processors and $r=4$ accelerators according to the prior art.

In summary, the method as claimed provides a hybrid computing system structure taking into account the peculiarities of the computing process being run. In its turn it enables to reduce the computing time and to speed up solving application problems.

TABLE 1

Computing Time Estimation Results

| Weak Scaling | Strong Scaling | Hybrid Computing System Structure |
|---|---|---|
| $\tilde{T}_{q,1} = T_1\varphi + T_1(1-\varphi)\dfrac{q}{\rho}$ | $T_{q,1} = T_1\dfrac{\varphi}{q} + T_1(1-\varphi)\dfrac{1}{\rho}$ | q processors, a single accelerator |
| $\tilde{T}_{1,r} = T_1\varphi r + T_1(1-\varphi)\dfrac{1}{\rho}$ | $T_{1,r} = T_1\varphi + T_1(1-\varphi)\dfrac{1}{r\rho}$ | a single processor, r accelerators |

TABLE 2

Speedup Values

| Weak Scaling | Strong Scaling | Hybrid Computing System Structure |
|---|---|---|
| $\tilde{K}_{q,1} = \dfrac{q}{\varphi + (1-\varphi)\dfrac{q}{\rho}}$ | $K_{q,1} = \dfrac{q}{\varphi + (1-\varphi)\dfrac{q}{\rho}}$ | q processors, 1 accelerator |
| $\tilde{K}_{q,1} = \dfrac{\rho}{1-\varphi}$, for $q \to \infty$ | $K_{q,1} = \dfrac{\rho}{1-\varphi}$, for $q \to \infty$ | |
| $\tilde{K}_{q,1} > q$, for $q < \rho$ | $K_{q,1} > q$, for $q < \rho$ | |
| $\tilde{K}_{1,r} = \dfrac{r}{\varphi r + \dfrac{1-\varphi}{\rho}}$ | $K_{1,r} = \dfrac{r}{\varphi r + \dfrac{1-\varphi}{\rho}}$ | 1 processor, r accelerators |
| $\tilde{K}_{1,r} = \dfrac{1}{\varphi}$, for $r \to \infty$ | $K_{1,r} = \dfrac{1}{\varphi}$, for $r \to \infty$ | |
| $\tilde{K}_{r,1} \geq r$, for $\rho > \dfrac{1-\varphi}{1-\varphi r}$ | $K_{r,1} \geq r$, for $\rho > \dfrac{1-\varphi}{1-\varphi r}$ | |
| $\tilde{K}_{q,r} = \tilde{K}_{m,1}$ $\tilde{K}_{q,r} = \tilde{K}_{1,n}$ | $K_{q,r} = K_{m,1}$ $K_{q,r} = K_{1,n}$ | q processors, r accelerators; for $q > r$, then $m = \dfrac{q}{r}$; for $q \leq r$, then $n = \dfrac{r}{q}$, wherein q and r being such, that m or n - are integers. |
| $\tilde{K}_{q,1} \geq \tilde{K}_{1,r}$ for $\rho \geq \dfrac{1-\varphi}{\varphi}$ | $K_{q,1} \geq K_{1,r}$ for $\rho \geq \dfrac{1-\varphi}{\varphi}$ | |

The invention claimed is:

1. A method for determining the structure of a hybrid computing system including an Multiple Instruction, Multiple Data (MIMD) component containing at least a single processor and a Single Instruction, Multiple Data (SIMD) component containing at least a single arithmetic accelerator, wherein the method comprises measuring the execution time $T_1$ for a problem to be solved with a program being run by a single processor, measuring the execution time $T_M$ and $T_S$ of MIMD and SIMD program fragments being run by a single processor and a single accelerator correspondingly, determining the specific acceleration ρ of the execution time for an SIMD program fragment being run by a single accelerator in comparison with the execution time for the fragment being run by a single processor and adjusting the quantity of processors or accelerators comprised into a hybrid computing system structure according to the data obtained, determining a portion φ of the execution time for an MIMD fragment being run by a single processor and a portion 1-φ of the execution time for an SIMD fragment being run by a single processor relative to the execution time of the program being run by a single processor; the ratio of the execution time portion for an SIMD fragment being run by a single processor and the execution time portion for an MIMD fragment being run by a single processor is compared with the specific acceleration value ρ of the execution time for an SIMD fragment being run by a single accelerator in comparison with the execution time for an SIMD fragment being run by a single processor, wherein for $$\rho > \frac{1-\varphi}{\varphi}$$

the quantity of MIMD component processors is being increased, and for $$\rho < \frac{1-\varphi}{\varphi}$$

the quantity of SIMD component accelerators is being increased.

* * * * *